United States Patent
Davis et al.

(10) Patent No.: US 6,889,320 B1
(45) Date of Patent: May 3, 2005

(54) MICROPROCESSOR WITH AN INSTRUCTION IMMEDIATELY NEXT TO A BRANCH INSTRUCTION FOR ADDING A CONSTANT TO A PROGRAM COUNTER

(75) Inventors: Alan L. Davis, Sugarland, TX (US); Richard H. Scales, Houston, TX (US); Natarajan Seshan, Houston, TX (US); Eric J. Stotzer, Houston, TX (US); Reid E. Tatge, Richmond, TX (US)

(73) Assignee: Texas Instruments Incorporated, Dallas, TX (US)

( * ) Notice: Subject to any disclaimer, the term of this patent is extended or adjusted under 35 U.S.C. 154(b) by 459 days.

(21) Appl. No.: 09/702,462

(22) Filed: Oct. 31, 2000

Related U.S. Application Data

(60) Provisional application No. 60/183,527, filed on Feb. 18, 2000, provisional application No. 60/183,357, filed on Feb. 18, 2000, and provisional application No. 60/173,795, filed on Dec. 30, 1999.

(51) Int. Cl.⁷ .............................................. G06F 9/42
(52) U.S. Cl. ........................................................ 712/233
(58) Field of Search .................................. 712/233, 243

(56) References Cited

U.S. PATENT DOCUMENTS

| | | | | |
|---|---|---|---|---|
| 4,799,151 | A | * 1/1989 | Iwao .......................... | 712/243 |
| 5,822,591 | A | * 10/1998 | Hochmuth ................... | 717/148 |
| 5,958,044 | A | * 9/1999 | Brown et al. ................ | 712/219 |
| 6,131,188 | A | * 10/2000 | Goebel ........................ | 717/141 |
| 6,137,836 | A | * 10/2000 | Haataja ................... | 375/240.08 |
| 6,237,077 | B1 | * 5/2001 | Sharangpani et al. ......... | 712/24 |
| 6,564,316 | B1 | * 5/2003 | Perets et al. ................ | 712/219 |

OTHER PUBLICATIONS

Hennessy and Patterson, "Computer Architecture—A Quantitative Approach, 2nd Edition," 1996, pp. 82 and 170.*
Hennessy and Patterson, "Computer Architecture—A Quantitative Approach, 2nd Edition," 1996, pp. 130, 134, 163, and 168–169.*
Texas Instruments, "TMS32010 User's Guide," 1983, p. 3–7.*
Rogers et al., "Supporting Dynamic Data Structures on Distributed–Memory Machines," Mar. 1995, pp. 234–263.*
Digital Equipment Corp., *PDP11/70 Processor Handbook*, 1975, pp. 1–1 to 1–9; pp. 3–10 to 3–15; pp. 9–1 to 9–9.

* cited by examiner

*Primary Examiner*—Eddie Chan
*Assistant Examiner*—David J. Huisman
(74) *Attorney, Agent, or Firm*—Robert D. Marshall, Jr.; W. James Brady, III; Frederick J. Telecky, Jr.

(57) ABSTRACT

A data processing system with a microprocessor that has an instruction execution pipeline that includes fetch and decode stages and several functional execution units. Fetch packets contain a plurality of instruction words. Execution packets include a plurality of instruction words that can be executed in parallel by two or more execution units. An execution packet can span two or more fetch packets. An add (k) constant to program counter (ADDKPC) instruction is provided, such that a parameter specified by the ADDKPC instruction is combined with a value provided by a program counter of microprocessor. The ADDKPC instruction can also specify a number of delay slots after a branch instruction to be filled with virtual NOP instructions such that memory is not wasted with useless NOP instructions. An ADDKPC instruction can provide a relative address for use as a return address. A plurality of predicated ADDKPC instructions can provide a return address selected from a plurality of return addresses. A compiler can reorder code with an ADDKPC instruction to absorb useless NOP instructions.

21 Claims, 10 Drawing Sheets

FIG. 3A

| INSTRUCTION A | INSTRUCTION B | INSTRUCTION C | INSTRUCTION D | INSTRUCTION E | INSTRUCTION F | INSTRUCTION G | INSTRUCTION H |
|---|---|---|---|---|---|---|---|
| P | P | P | P | P | P | P | P |
| 00000 | 00100 | 01000 | 01100 | 10000 | 10100 | 11000 | 11100 |

LSBs OF THE BYTE ADDRESS

FIG. 3B

Instructions A–H, each with leading bit 0.

FIG. 3C

Instructions A–H, with leading bits: 1, 1, 1, 1, 1, 1, 1, 1 (pattern per figure).

FIG. 3D

Instructions A–H, with leading bits: 0, 0, 1, 1, 1, 0, 1, 1.

MICROPROCESSOR WITH AN INSTRUCTION IMMEDIATELY NEXT TO A BRANCH INSTRUCTION FOR ADDING A CONSTANT TO A PROGRAM COUNTER

This application claims priority under 35 USC § 119(e)(1) of Provisional Application No. 60/183,527, filed Feb. 18, 2000 of Provisional Application No. 60/173,795, filed Dec. 30, 1999 and of Provisional Application No. 60/183,357, filed Feb. 18, 2000.

NOTICE (C) Copyright 2000 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to forming program counter relative addresses for microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes instruction fetch packets and multiple instruction execution packets with multiple functional units, referred to as a Very Long Instruction Word (VLIW) architecture.

Digital systems designed on a single integrated circuit are referred to as an application specific integrated circuit (ASIC). MegaModules are being used in the design of ASICs to create complex digital systems on a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner.

The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor and a method for executing an ADDKPC instruction that adds a constant to a program counter value and saves the result in a general purpose register, thereby improving digital signal processing performance. Aspects of the invention are specified in the claims.

In an embodiment of the present invention, fetch packets contain a plurality of instruction words. Execution packets include a plurality of instruction words that can be executed in parallel by two or more execution units. An execution packet can span two or more fetch packets. The program counter value used by an ADDKPC instruction corresponds to the fetch packet containing the ADDKPC instruction, even if the execute packet spans fetch packets.

In an embodiment of the present invention, a digital processing system comprises a microprocessor, and the microprocessor is operable to perform a method for calling a subroutine. The method comprises the steps of: a) branching to the subroutine by executing a first instruction to provide an address of the subroutine, and b) calculating a return address by executing a second instruction to determine a relative return address. The second instruction is executed before executing the first instruction in the digital processing system.

In another embodiment of the present invention, the ADDKPC instruction also specifies a number of no operation (NOP) instructions to be executed after the ADDKPC instruction.

Another embodiment of the present invention is a wireless telephone with a microprocessor that includes an ADDKPC instruction.

Another embodiment of the present invention is a compiler that evaluates instructions associated with a branch instruction and absorbs NOP instructions associated with delay slots after the branch instruction into an instruction for calculating a program counter relative address.

BRIEF DESCRIPTION OF THE DRAWINGS

Other features and advantages of the present invention will become apparent by reference to the following detailed description when considered in conjunction with the accompanying drawings, in which:

FIG. 3A shows the basic format of a fetch packet of the DSP of FIG. 1;

FIG. 3B depicts a fetch packet of FIG. 3A with fully serial p-bits;

FIG. 3C depicts a fetch packet of FIG. 3A with fully parallel p-bits;

FIG. 3D depicts a fetch packet of FIG. 3A with partially serial p->bits;

FIG. 4A illustrates phases of the instruction execution pipeline of the DSP of FIG. 1;

FIG. 4B illustrates execution of a branch instruction in the pipeline of FIG. 4A;

FIG. 4C depicts fetch packet n, which contains three execute packets, shown followed by six fetch packets n+1 through n+6, each with one execution packet containing 8 parallel instructions;

FIG. 6C is a flow chart illustrating a subroutine call B func with a return address computed using an ADDKPC instruction, a MV instruction inserted in a delay slot, and a NOP instruction;

FIG. 6D is a flow chart illustrating the instructions of FIG. 6C re-ordered to absorb the NOP instruction, according to an aspect of the present invention;

DETAILED DESCRIPTION OF EMBODIMENTS OF THE INVENTION

Figure 1:
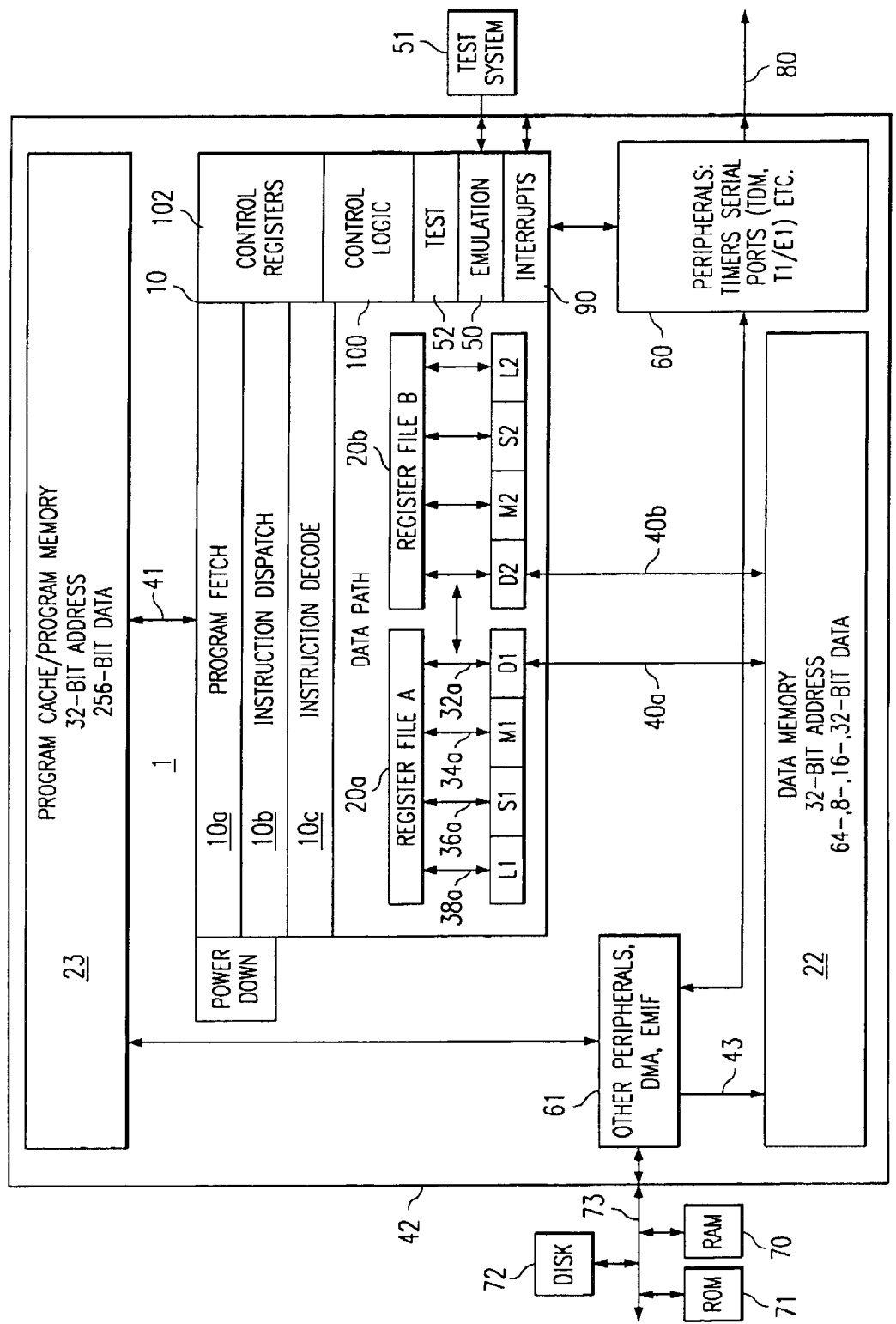
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a–c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Decoded instructions are provided from the instruction fetch/decode unit 10a–c to the functional units D1, M 1, S1, and L1 over various sets of control lines which are not shown. Data are provided to/from the register file 20a from/to to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a Note that the entire data path described above is duplicated with register file 20b and execution units D2, M2, S2, and L2. Load/store unit D2 similarly interfaces with memory 22 via a set of busses 40b. Instructions are fetched by fetch unit 10a from instruction memory 23 over a set of busses 41. Emulation circuitry 50 provides access to the internal operation of integrated circuit 1 which can be controlled by an external test/development system (XDS) 51.

External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 1. A Direct Memory Access (DMA) controller is also included within block 61. The DMA controller part of functional block 61 connects to data memory 22 via bus 43 and is generally used to move data between memory and peripherals within microprocessor 1 and memory and peripherals which are external to microprocessor 1.

A detailed description of various architectural features of the microprocessor of FIG. 1 is provided in coassigned U.S. Pat. No. 6,182,203 and is incorporated herein by reference. A detailed description of enhancements and extensions included in the architecture of microprocessor 1 is provided in coassigned U.S. patent application Ser. No. 09/702,096 and is incorporated herein by reference.

Figure 2A:
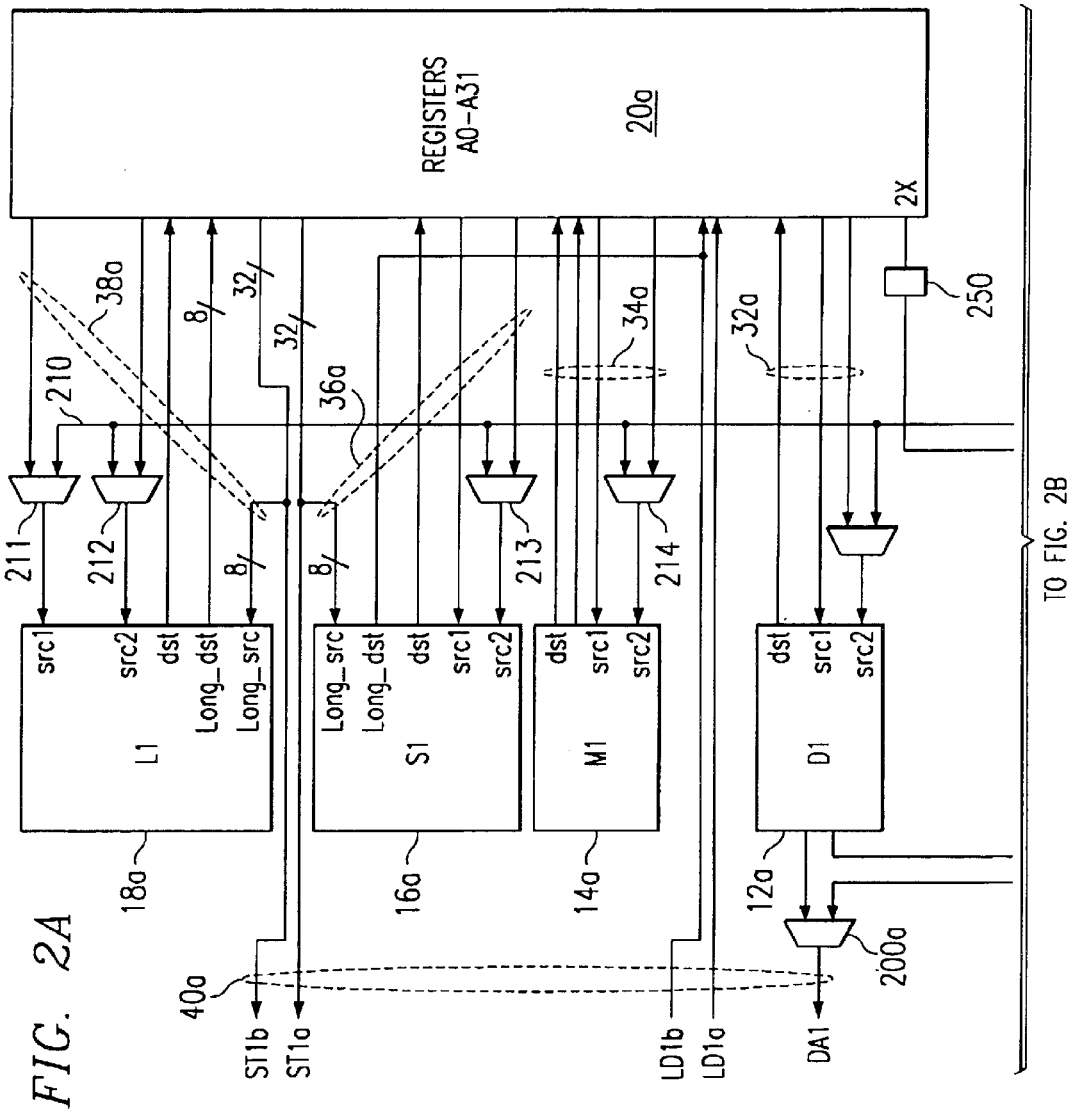
FIGS. 2A and 2B show a block diagram of the functional units, data paths and register files of FIG. 1.
Figure 2B:
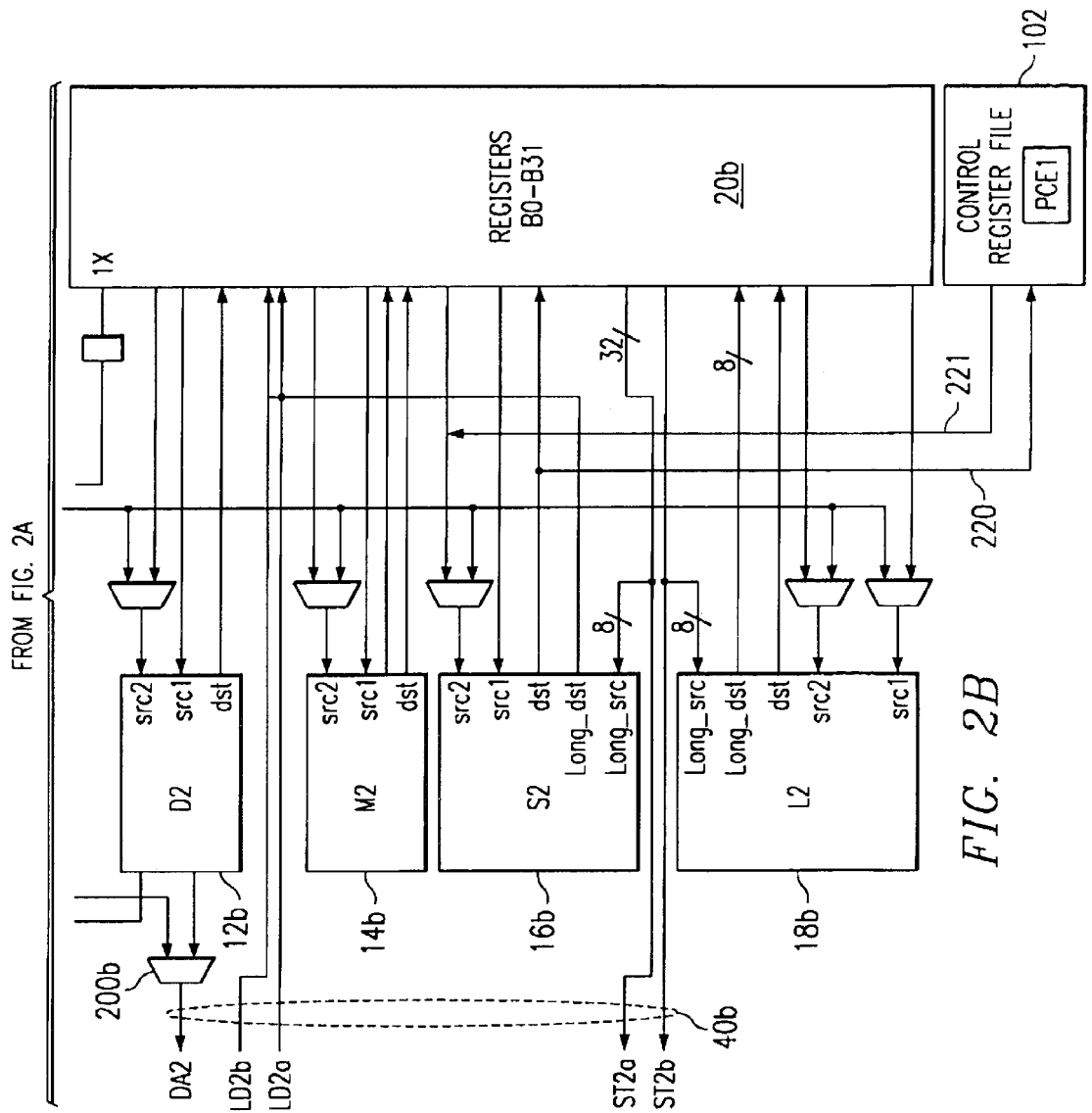

FIGS. 2A and 2B show a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for register file A 20a and B0–B31 for register file B 20b). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

The eight functional units in processor 10's data paths can be divided into two groups of four; each functional unit in one data path is almost identical to the corresponding unit in the other data path. The functional units are described in Table 1.

Besides being able to perform 32-bit data manipulations, processor 10 also contains many 8-bit and 16-bit data instructions in the instruction set. For example, the MPYU4 instruction performs four 8×8 unsigned multiplies with a single instruction on an .M unit. The ADD4 instruction performs four 8-bit additions with a single instruction on an .L unit.

TABLE 1

Functional Units and Operations Performed

| Functional Unit | Fixed-Point Operations |
|---|---|
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |

TABLE 1-continued

Functional Units and Operations Performed

| Functional Unit | Fixed-Point Operations |
|---|---|
| .S unit (.S1, .S2) | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file 20a or 20b (Refer to FIG. 2A). All units ending in 1 (for example, .L1) write to register file A 20a and all units ending in 2 write to register file B 20b. Each functional unit has two 32-bit read ports for source operands src1 and src2. Four units (.L1, .L2, S1, and .S2) have an extra 8-bit-wide port for 40-bit long writes, as well as an 8-bit input for 40-bit long reads. Because each unit has its own 32-bit write port, when performing 32-bit operations all eight units can be used in parallel every cycle. Since each multiplier can return up to a 64-bit result, two write ports (dst1 and dst2) are provided from the multipliers to the respective register file.

Each functional unit reads directly from and writes directly to the register file within its own data path. That is, the .L1 unit 18a, .S1 unit 16a, .D1 unit 12a, and .M1 unit 14a write to register file A 20a and the .L2 unit 18b, .S2 unit 16b, .D2 unit 12b, and M2 unit 14b write to register file B 20b. The register files are connected to the opposite-side register file's functional units via the 1× and 2× cross paths. These cross paths allow functional units from one data path to access a 32-bit operand from the opposite side's register file. The IX cross path allows data path A's functional units to read their source from register file B. Similarly, the 2× cross path allows data path B's functional units to read their source from register file A.

S2 unit 16b may write to control register file 102 from its dst output via bus 220. S2 unit 16b may read from control register file 102 to its src2 input via bus 221.

All eight of the functional units have access to the opposite side's register file via a cross path. The .M1, .M2, .S1, and .S2 units' src2 inputs are selectable between the cross path and the same side register file by appropriate selection of multiplexers 213–214, for example. On units .L1 and .L2, depending on the particular opcode, either the src1 or the src2 input, but not both simultaneously, is selectable between the cross path and the same-side register file by appropriate selection of multiplexers 211–212, for example. Cross path IX bus 210 couples one input of multiplexer 211 for src1 input of L1 unit 18a, multiplexer 212 for src2 input of .L1 unit 18a, multiplexer 213 for src2 input of .S1 unit 16a and multiplexer 214 for scr2 input of .M1 unit 14a Multiplexers 211, 212, 213, and 214 select between the cross path IX bus 210 and an output of register file A 20a. Buffer 250 buffers cross path 2× output to similar multiplexers for .L2, .S2, .M2, and .D2 units.

Memory, Load and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1 loads data from an address in memory 22 specified by address bus DA1 to a register in load unit DL. Unit D1 may manipulate the data provided prior to storing it in register file 20a Likewise, data bus ST1 stores data from register file 20a to memory 22. Load/store unit D1 performs the following operations: 32-bit add, subtract, linear and circular address calculations. Load/store unit D2 operates similarly to unit D1 via bus 40b with the assistance of mux 200b for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations appear in functional unit fields for load and store instructions.

For example, the following load instruction uses the .D1 unit to generate the address but is using the LD2a path resource from DA2 to place the data in the B register file. The use of the DA2 resource is indicated with the T2 designation.

LDW.D1T2*A0[3], B1

A set of basic instructions included in DSP 10 is described in U.S. Pat. No. 6,182,203, incorporated herein by reference). A set of extended instructions is included in this embodiment of the present invention, as described in U.S. patent application Ser. No. 09/702,096, incorporated herein by reference). Alternative embodiments of the present invention may have different sets of instructions and functional unit mapping. The instruction sets discussed above are illustrative and are not exhaustive or intended to limit various embodiments of the present invention.

Instructions are always fetched eight at a time. This constitutes a fetch packet. The basic format of a fetch packet is shown in FIG. 3A. The execution grouping of the fetch packet is specified by the p-bit, bit zero, of each instruction. Fetch packets are Sword aligned.

The p bit controls the parallel execution of instructions. The p bits are scanned from left to right (lower to higher address). If the p bit of instruction i is 1, then instruction i+1 is to be executed in parallel with (in the same cycle as) instruction i. If the p-bit of instruction i is 0, then instruction i+1 is executed in the cycle after instruction i. All instructions executing in parallel constitute an execute packet. An execute packet in this embodiment can contain up to eight instructions. All instructions in an execute packet must use a unique functional unit.

The following examples illustrate the conversion of a p-bit sequence into a cycle-by-cycle execution stream of instructions. There are three types of p-bit patterns for fetch packets. These three p-bit patterns result in the following execution sequences for the eight instructions: fully serial; fully parallel; or partially serial. These three sequences of execution are explained more fully below.

The fully serial p-bit pattern depicted in FIG. 3B results in an execution sequence illustrated in Table 2, in which the eight instructions are executed sequentially.

TABLE 2

Fully Serial p-bit Pattern Execution Sequence

| Cycle | Instructions |
| --- | --- |
| 1 | A |
| 2 | B |
| 3 | C |
| 4 | D |
| 5 | E |
| 6 | F |
| 7 | G |
| 8 | H |

The fully parallel p-bit pattern depicted in FIG. 3C results in an execution sequence illustrated in Table 3 in which all eight instructions are executed in parallel.

TABLE 3

Fully Parallel p-bit Pattern Execution Sequence

| Cycle | Instructions | | | | | | | |
| --- | --- | --- | --- | --- | --- | --- | --- | --- |
| 1 | A | B | C | D | E | F | G | H |

The partially serial p-bit pattern depicted in FIG. 3D results in an execution sequence illustrated in Table 4. Note that the instructions C, D, and E do not use any of the same functional units, cross paths, or other data path resources. This is also true for instructions F, G, and H.

TABLE 4

Partially Serial p-bit Pattern Execution Sequence

| Cycle | Instructions | | | |
| --- | --- | --- | --- | --- |
| 1 | A | | | |
| 2 | B | | | |
| 3 | C | | D | E |
| 4 | F | | G | H |

In the previous partially serial example, the code would be represented as follows, where the || characters signify that an instruction is to execute in parallel with the previous instruction:

|     | instruction | A |
|-----|-------------|---|
|     | instruction | B |
|     | instruction | C |
| \|\| | instruction | D |
| \|\| | instruction | E |
|     | instruction | F |
| \|\| | instruction | G |
| \|\| | instruction | H |

If a branch into the middle of an execution packet occurs, all instructions at lower addresses are ignored. In the partially serial example, if a branch to the address containing instruction D occurs, then only D and E will execute. Even though instruction C is in the same execute packet, it is ignored. Instructions A and B are also ignored because they are in earlier execute packets.

All instructions can be conditional. The condition is controlled by a 3-bit (creg) field specifying the register tested, and a 1-bit field (z) specifying a test for zero or nonzero. The four MSBs of every opcode are creg and z and are referred to as a predicate. The register is tested at the beginning of the E1 pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. Conditional instructions are represented by "[ ]" surrounding the condition register.

The instruction execution pipeline operation, from a functional point of view, is based on CPU cycles. A CPU cycle is the period during which a particular execute packet is in a particular pipeline stage, also referred to as a phase. CPU cycle boundaries always occur at clock cycle boundaries; however, memory stalls can cause CPU cycles to extend over multiple clock cycles. To understand the machine state at CPU cycle boundaries, one must be concerned only with the execution phases (E1–E5) of the pipeline. The phases of the pipeline are illustrated in FIG. 4A and described in Table 5.

TABLE 5

Pipeline Phase Description

| Pipeline | Pipeline Phase | Symbol | During This Phase | Instruction Types Completed |
|----------|----------------|--------|-------------------|------------------------------|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructiona: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

The execution of instructions can be defined in terms of delay slots. A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction. The pipeline operation of the instructions can be categorized into seven types shown in Table 6. The delay slots for each instruction type are listed in the second column.

TABLE 6

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

Single cycle instructions execute during the E1 phase of the pipeline. The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register until E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots.

Branch instructions execute during the E1 phase of the pipeline five delay slots/CPU cycles after the branch instruction enters an initial E1 phase of the pipeline. FIG. 4B illustrates execution of a branch instruction in the pipeline of FIG. 4A. If a branch is in fetch packet n that begins with a PG phase at clock cycle 1, not shown in FIG. 4B, then the E1 phase of the branch occurs at clock cycle 7 and initiates the PG phase of a branch target instruction that is contained in a fetch packet m. The branch target instruction in fetch packet m will reach its E1 phase at clock cycle 13. Thus, it appears as if the branch takes six cycles to execute, or has five delay slots, as illustrated in FIG. 4B.

In FIG. 4C, fetch packet n, which contains three execute packets, is shown followed by six fetch packets (n+1 through n+6), each with one execution packet (containing 8 parallel instructions). The first fetch packet (n) goes through the program fetch phases during cycles 1–4. During these cycles a program fetch phase is started for each of the following fetch packets.

In cycle 5, the program dispatch (DP) phase, the CPU scans the p bits and detects that there are three execute packets (k thru k+2) in fetch packet n. This forces the pipeline to stall, which allows the DP phase to start execute packets k+1 and k+2 in cycles 6 and 7. Once execute packet k+2 is ready to move on to the DC phase (cycle 8) the pipeline stall is released.

The fetch packets n+1 through n+4 were all stalled so the CPU would have time to perform the DP phase for each of the three execute packets (k thru k+2) in fetch packet n. Fetch packet n+5 was also stalled in cycles 6 and 7; it was not allowed to enter the PG phase until after the pipeline stall was released in cycle 8. The pipeline will continue as shown with fetch packets n+5 and n+6 until another fetch packet containing multiple execution packets enters the DP phase, or an interrupt occurs.

Figure 5:
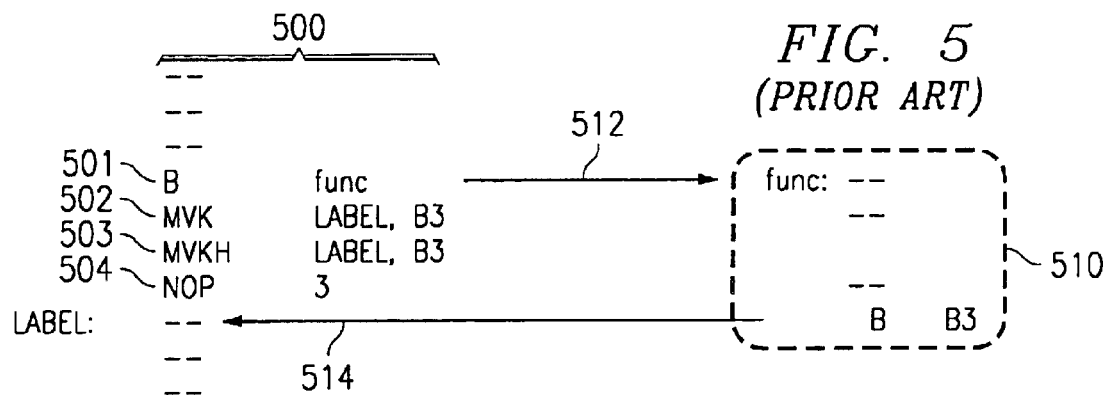
FIG. 5 is a flow chart illustrating a subroutine call in a prior art DSP.

FIG. 5 is a flow chart illustrating a subroutine call in a prior art DSP, a TMS320C62xx produced by Texas Instruments Incorporated. During execution of a program sequence 500, a subroutine 510 is called by executing a branch instruction 501 that provides an address displacement "fune" to subroutine 510 relative to the current contents of a program counter that is used to provide the addresses of program sequences. As is known, address displacement "fune" is added to the program counter and program execution branches to the address associated with the address displacement value, as indicated by arc 512.

In this prior art DSP, there is no CALL instruction that automatically forms a return address. Therefore, a return address is formed by executing a move constant instruction (MVK) 502 that moves the least significant half of the address "LABEL" into the least significant half of general purpose register B3, and by executing a move constant instruction high (MVKH) 503 that moves the most significant half of the address "LABEL" into the most significant half of general purpose register B3. At the completion of subroutine 510, an indirect branch instruction is executed that branches to the address indicated by a source register, in this case register B3, as indicated by arc 514.

In this prior art DSP, a branch instruction has five delay slots, similar to the embodiment of the present invention, as discussed above. Therefore, if there are no other instructions that can be usefully executed in instruction sequence 500, then a multi-cycle no-operation instruction (NOP) 504 is executed with a parameter of "3" to occupy the remaining three delay slots after executing instructions 502 and 503.

Figure 6A:
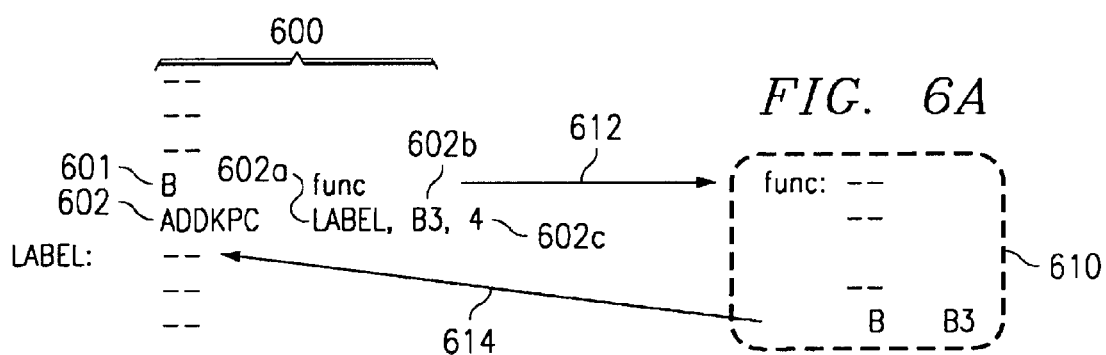
FIG. 6A is a flow chart illustrating a subroutine call with a return address computed using an ADDKPC instruction, according to an aspect of the present invention.

FIG. 6A is a flow chart illustrating a subroutine call with a return address computed using an "add constant to program counter" (ADDKPC) instruction 602, according to an aspect of the present invention. During execution of a program sequence 600, a subroutine 610 is called by executing a branch instruction 601 that provides an address displacement "func" to subroutine 610 relative to the current contents of a program counter that is used to provide the addresses of program sequences. As is known, address displacement "func" is added to the program counter and program execution branches to the address associated with the address displacement value, as indicated by arc 612.

ADDKPC instruction 602 includes a relative displacement field 602a that points to an address that is to be returned to. In this example, the relative displacement field points to the address indicated at "LABEL." Therefore, when instruction 602 is executed, a relative address is formed by combining a displacement value provided by the instruction with an address value provided by the program counter. Thusly, the program counter is treated as a source register for the ADDKPC instruction, although program counter values are delayed, as described later. The resultant calculated relative address associated with "LABEL" is stored in a destination register 602b specified by instruction

602, in this example general purpose register B3. Thus, at the completion of subroutine 610, an indirect branch instruction is executed that branches to the address indicated by a source register that contains a return address, in this case register B3, as indicated by arc 614.

In a similar manner, a return address can be calculated to a remote location by providing an appropriate displacement value. In this case, after execution of a subroutine is completed, a return branch will branch to an instruction sequence that is not contiguous with the instruction sequence that called the subroutine.

Another aspect of the ADDKPC instruction is that a parameter field 602c is provided that specifies a number of delay slots that are to be no-op'ed with virtual NOP instructions. In this embodiment of the present invention, a branch instruction has five delay slots, as discussed above. Therefore, up to five instructions will be executed prior to execution of the target instruction of a branch instruction. If no meaningful instructions can be placed in the delay slots, then NOP instructions must be placed there, or a multi-cycle-NOP instructions, such as instruction 504. In this example, parameter field 602c contains the number "4" such that four delay slots will be traversed without dispatching an instruction since the ADDKPC instruction 602 occupies one delay slot. In a similar manner, a branch with NOP instruction (BNOP) provides a parameter field that specifies a number of delay slots that are to be no-op'ed with virtual NOP instructions, as described in more detail in U.S. patent application Ser. No. 09/702,484 and is incorporated herein by reference.

Advantageously, ADDKPC instruction 602 replaces instructions 502–504 for providing a return address and thereby reduces code size. Furthermore, power dissipation is reduced since fewer instructions are fetched. Advantageously, an ADDKPC instruction provides a relative return address so that program sequence 600 and subroutine 610 may be relocated to another program address range without changing program sequence 600.

The format for the ADDKPC instruction is shown in Table 7.

TABLE 7

ADDKPC Instruction Format

| format | ADDKPC (unit), src1, dst, src2 | | | | | | | |
|---|---|---|---|---|---|---|---|---|
| | Where: | | | | | | | |
| | Src1 is a seven bit signed constant | | | | | | | |
| | Src2 is ncnt, a 3 bit unsigned constant that defines a parallel number of NOPs | | | | | | | |
| | Dst is a register | | | | | | | |
| field | 31–29 | 28 | 27–23 | 22–16 | 15–13 | 12 | 11–2 | 1 | 0 |
| Name | Creg | Z | Dst | disp | ncnt | 0 | Op-code | s | p |
| Width | 3 | 1 | 5 | 7 | 3 | 1 | 10 | 1 | 1 |

The displacement field (disp, a 7-bit constant) is shifted left by two and then added to the address of the fetch packet containing the ADDKPC instruction AND'ed with INV(31) (invert bits of binary value of 31). The result is placed in the destination register. In this embodiment a delayed version of the fetch packet program counter (PCF) is maintained that corresponds to the address of the instruction that is currently in the first execute phase of the pipeline (E1) and is referred to as PCE1. PCE1 represents the address of the first instruction of the fetch packet containing the instruction being executed. It is the same as the address of this ADDKPC instruction truncated to a fetch packet boundary (32 bytes).

Note that if the execute packet spans two fetch packets, the instructions in the second fetch packet will see the value of the PCE1 register as 32 greater than the value seen by the first instruction in the execute packet. The operation of PCE1 will be described in more detail with reference to FIGS. 7–9. An assembler/linker can automatically compute the correct value for disp by the following formula:

$$disp=(\text{address}(LABEL)-(\text{address}(\text{this\_instruction})\&INV(31)))>>2.$$

In this embodiment, ADDKPC cannot be paired with a relative branch instruction. ADDKPC cannot be paired with a multi-cycle NOP instruction. An execute packet containing these conditions will result in an execute packet exception event. In this embodiment, an ADDKPC instruction must be executed in the .S2 unit, therefore the s bit must be "1." However, in another embodiment, resources may be provided to allow an ADDKPC instruction to be executed by either s-unit and to allow such combinations of instructions.

The NOP portion of the ADDKPC instruction executes regardless of the predication on the ADDKPC instruction, although all of the specified NOPs may not execute due to taken branches executed earlier. The multi-cycle NOP induced by this instruction will be terminated early if a branch delay is completed first. For example, if a branch is initiated on cycle n and an ADDKPC instruction with ncnt=5 is initiated on cycle n+1, the branch is complete on cycle n+6 and the NOP is executed only from cycle n+2 to cycle n+5, only 4 cycles.

Figure 6B:
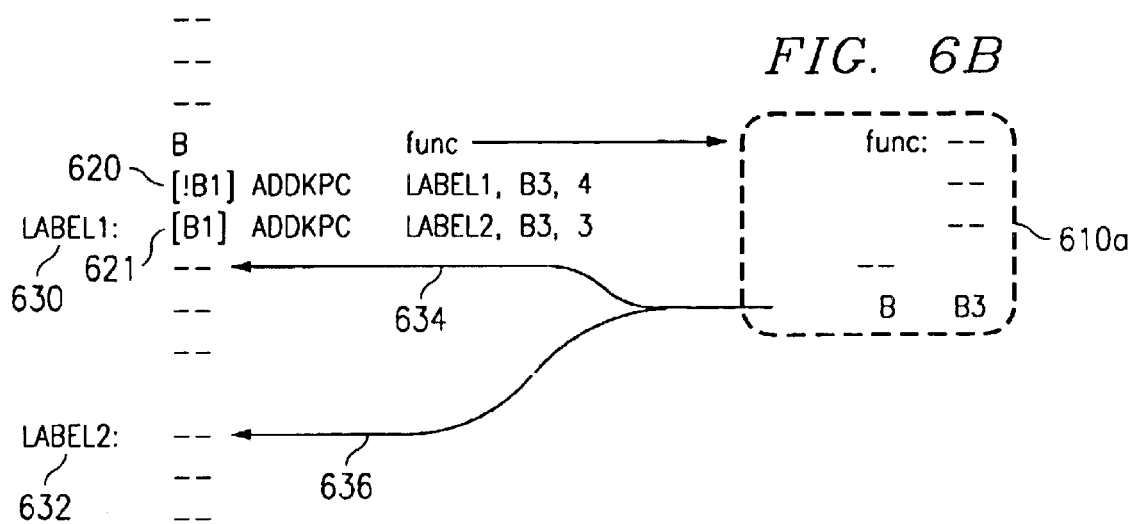
FIG. 6B is a flow chart illustrating a subroutine call with multiple return addresses computed using more than one ADDKPC instruction.

FIG. 6B is a flow chart illustrating a subroutine call with multiple return addresses computed using more than one ADDKPC instruction. In this example, ADDKPC instruction 620 includes a displacement to LABEL1 Indicated at 630 and ADDKPC instruction 621 includes a displacement to LABEL2 indicated at 632. ADDKPC instruction 620 is conditionally executed if register B1, indicated as a predicate register, is zero. In this case, a return address pointing to LABEL1 will be stored in destination register B3 and subroutine 610a will return via arc 634. ADDKPC instruction 621 is executed conditionally if predicate register B1 is not zero. In this case, a return address pointing to LABEL2 will be stored in destination register B3 and subroutine 610a will return via arc 636.

Likewise, more than two ADDKPC instructions can be conditionally executed to select a return address from a large set of potential return address. In this case, several different predicate values can be used. Similarly, several ADDKPC instructions may have predicate values that are satisfied and therefore be executed. In such a case, the last executed ADDKPC instruction will overwrite a return address provided by any previously executed ADDKPC instructions.

Figure 7:
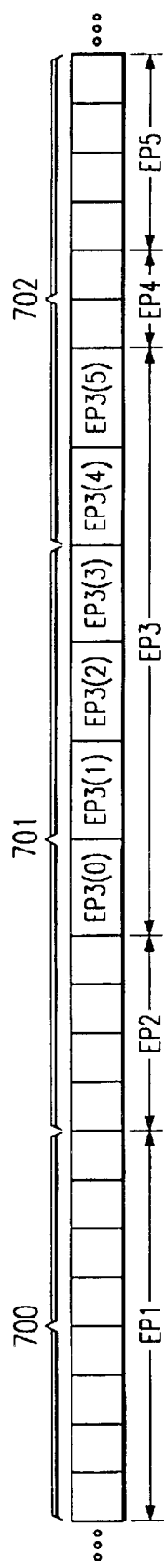
FIG. 7 is an illustration of execution packets spanning fetch packets for the processor of FIG. 1.

FIG. 7 is an illustration of execution packets spanning fetch packets for the processor of FIG. 1. Advantageously, in the present embodiment of processor 10, an execution packet can cross an eight-word fetch packet boundary, thereby eliminating a need to add NOP instructions to pad fetch packets. For example, eight-word execution packet EP1 completely occupies fetch packet 700. Four-word execution packet EP2 partially fills fetch packet 701. Six-word execution packet EP3 does not fit completely within fetch packet 701 however, the first four words EP3(0)-EP3 (3) are placed in fetch packet 701 and the last two words EP3(4), EP3(5) are placed in fetch packet 702. Therefore, the last p bit in a fetch packet is not always set to 0 in processor 10. If the last p-bit of a fetch packet is not zero, then instruction fetch control circuitry in stage 10a (FIG. 1) fetches a second fetch packet and extracts instruction words until a p bit set to 0 is encountered. This sequence of instruction words is then ordered into a single execution packet, such as execution packet EP3, for example.

Figure 8:
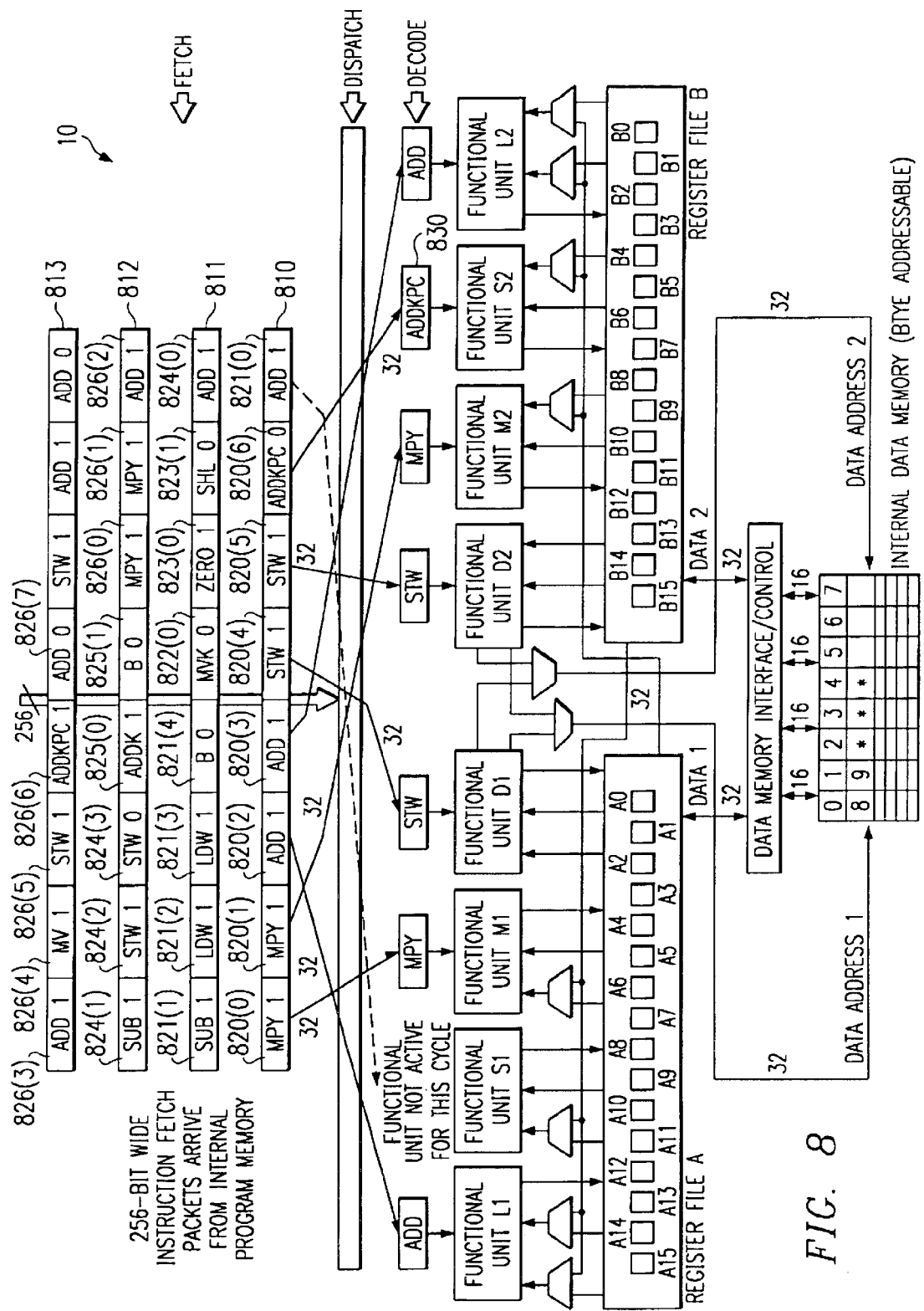
FIG. 8 is a block diagram of the processor of FIG. 1, illustrating a sequence of execution packets spanning fetch packets.

FIG. 8 is a block diagram of processor 10 of FIG. 1, illustrating a sequence of execution packets spanning fetch packets 810–813, according to an aspect of the present invention. For example, execution packet 820 comprises only the seven instructions 820(0)–820(6). The last instruction word 820(6) has the p bit set to 0. Advantageously, the first word 821(0) of execution packet 821 is now placed in fetch packet 810. Note that the p-bit of instruction word 821(0) is set to 1 to indicate that execute packet 821 continues to the next fetch packet 811 where instruction words 821(1)–821(4) are located. In this example, instruction 820(6) is an ADDKPC instruction that will be dispatched and decoded for execution on unit S2, as indicated at decode block 830. PCE1 will contain an address associated with fetch packet 810 when instruction 820(6) reaches the first execute phase of unit S2.

Execution packet 823 with instruction words 823(0)–823(1) is located within fetch packet 811 after instruction word 822(0). Note that the last word of the fetch packet does not necessarily have the p-bit set to 0, for example instruction words 821(0) and 824(0) both have their p-bit set to one indicating that their associated execution packet spans to the next fetch packet. Thus, instruction words 824(1–3) are located in fetch Racket 812. Likewise, execution packet 826 spans fetch packets 812 and 813 with instruction words 826(0–2) located in fetch packet 812 after instruction words 825(0–1) and instruction words 826(3–7) located in fetch packet 813. In this example, instruction word 826(6) is an ADDKPC instruction. However, since instruction 826(6) is in the second fetch packet 813 of execution 826, PCE1 will contain an address associated with fetch packet 813 when instruction 826(6) reaches the first execute phase of unit S2. U.S. patent application Ser. No. 09/702,320 provides further details and is incorporated herein by reference.

Figure 9:
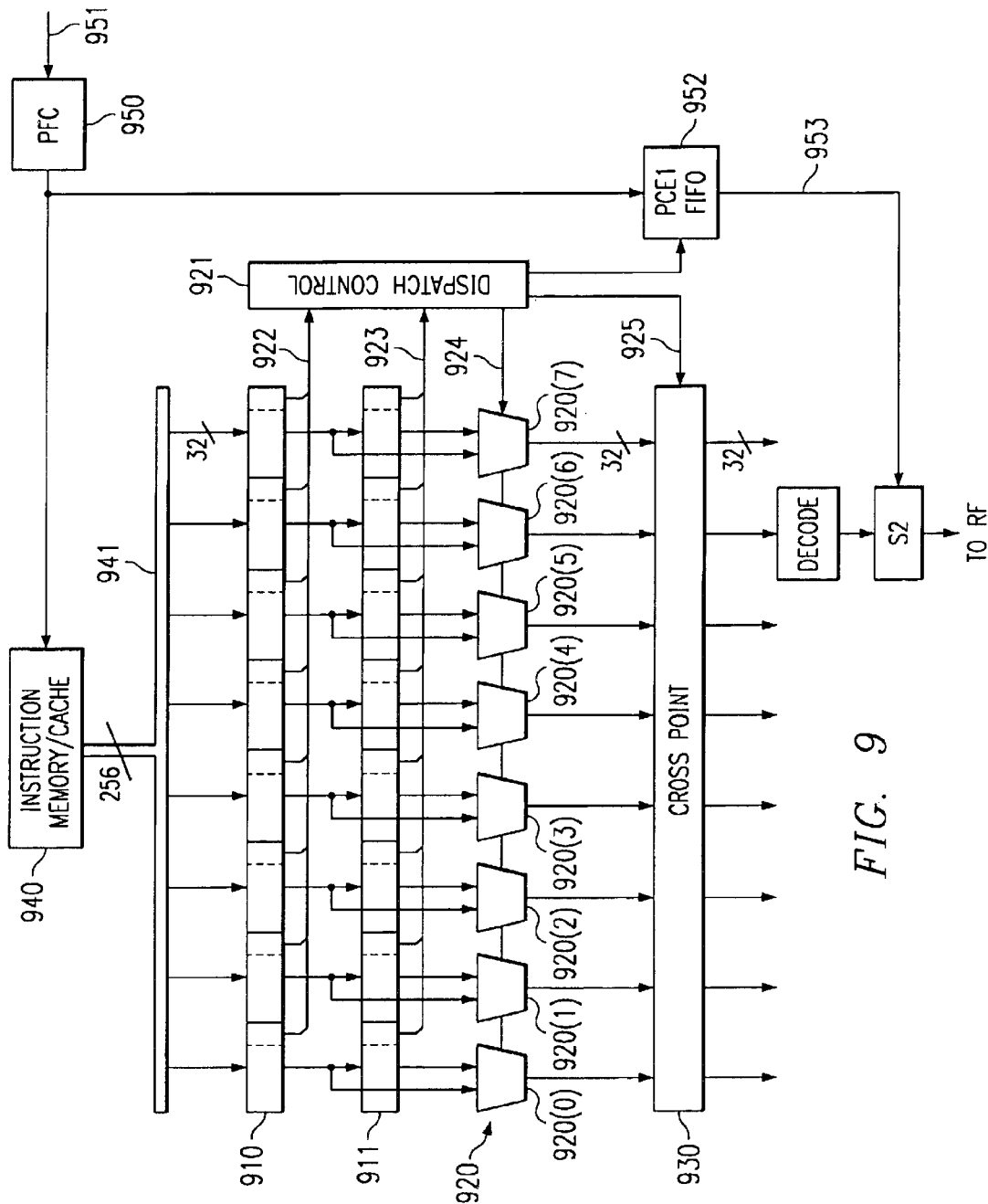
FIG. 9 is a block diagram of a portion of the instruction fetch pipeline of the processor of FIG. 1 that illustrates circuitry for dispatching an execution packet that spans two fetch packets.

FIG. 9 is a block diagram of a portion of instruction fetch pipeline stages 10a–10c of processor 10 of FIG. 1 that illustrates circuitry for dispatching an execution packet that spans two fetch packets. An eight word fetch packet is received on instruction data bus 941 from an instruction memory/cache 940 into a first latch stage 910 in response to fetch packet program counter (PCF) 950. A second latch stage 911 receives the first fetch packet on the next clock cycle while a second fetch packet is received simultaneously into latch stage 910. Fetch pipe stalls are generated as needed, as discussed with reference to FIG. 4C, if latch stage 910 is not free when a fetch packet arrives on instruction bus 941.

Multiplexor set 920 has eight individually controlled multiplexors 920(0)–920(7) that each have a first input connected to receive a 32-bit instruction word from first latch stage 910 and a 32-bit instruction word from second latch stage 911. Dispatch control circuitry 921 monitors the p-bit associated with each of the eight instructions in latch stage 910 via p-bit signals 922. An execution packet within latch stage 910 is selected by appropriate controls signals 924 asserted by dispatch control circuitry 921 to multiplexor set 920 and is passed thereby to crosspoint circuitry 930 in response to control signals 925 and on to the various decode circuitry associated with the execution units of processor 10, as illustrated in FIG. 8.

If a first execution packet does not entirely fill the first fetch packet, then the second execution packet is selected from second latch stage 911 on a following clock cycle. Dispatch control circuitry 921 monitors second stage p-bit signals 923 and asserts controls signals 924 appropriately to multiplexor set 920 to select the second execution packet from latch stage 911 and it is passed thereby to crosspoint circuitry 930 in response to control signals 925 and on to the various decode/execution units of processor 10.

If the second execute packet spans the first and second fetch packets, then a first portion of the second execute packet is selected from latch stage 911 and a remaining portion is selected from latch stage 910. Dispatch control circuitry 921 monitors p-bit signals 922 and 923 and asserts control signals 924 appropriately so that multiplexor set 920 selects the first portion of the second execute packet from latch stage 911 and the remaining portion from latch stage 910.

PCE1 FIFO (first in first out) circuit 952 receives a copy of each program counter value from PFC 950 that is used to fetch an instruction packet. PFC 950 generally increments, but also receives branch addresses via update bus 951. PCE1 952 is responsive to dispatch control circuitry 921 to provide a program counter value to functional unit S2 via bus 953 that corresponds to the address of the fetch packet that contains the instruction in the E1 execution stage of functional unit S2. Whenever functional unit S2 executes an ADDKPC instruction or a relative branch instruction, the PCE1 value associated with the fetch packet that contains the ADDKPC or branch instruction is combined with a displacement value provided by the instruction.

Compiler considerations

In general, the design and use of compilers are known in the art, therefore it is not necessary to further describe compilers herein. In these embodiments of the invention described herein, a CALL instruction for calling subroutines and forming a return address is not provided. It has been determined that a compiler can better optimize code generation and program execution if separate instructions are provided for branching to a subroutine and for determining a return address from the subroutine.

An ADDKPC instruction facilitates generation of relocatable code by a compiler. When return addresses are calculated relative to the PC, the code can be moved around. This could be useful when code is overlayed in fast on-chip memory.

A compiler can embody an aspect of the present invention to use an ADDKPC instruction to re-order a sequence of instructions to place the ADDKPC in such a way that the parallel NOP field is used to encode any NOPs in the delay slot of a calling branch instruction. This is done to save code size. For example, the instruction sequence shown in FIG. 6C and described below:

| | | |
|---|---|---|
| B | func | ; call a subroutine |
| ADDKPC | R0,B3 | ; calculate return address |
| MV | A10,AA4 | ; move parameter |
| NOP 3 | | ; three NOPs for the remaining delay slots | would be re-ordered at shown in FIG. 6D and described below to "absorb" the NOP

| | | |
|---|---|---|
| B | func | ; call a subroutine |
| MV | A10,A4 | ; move parameter |
| ADDKPC | R0,B3,3 | ; provides three virtual NOPs for remaining delay slots |

Figure 10:
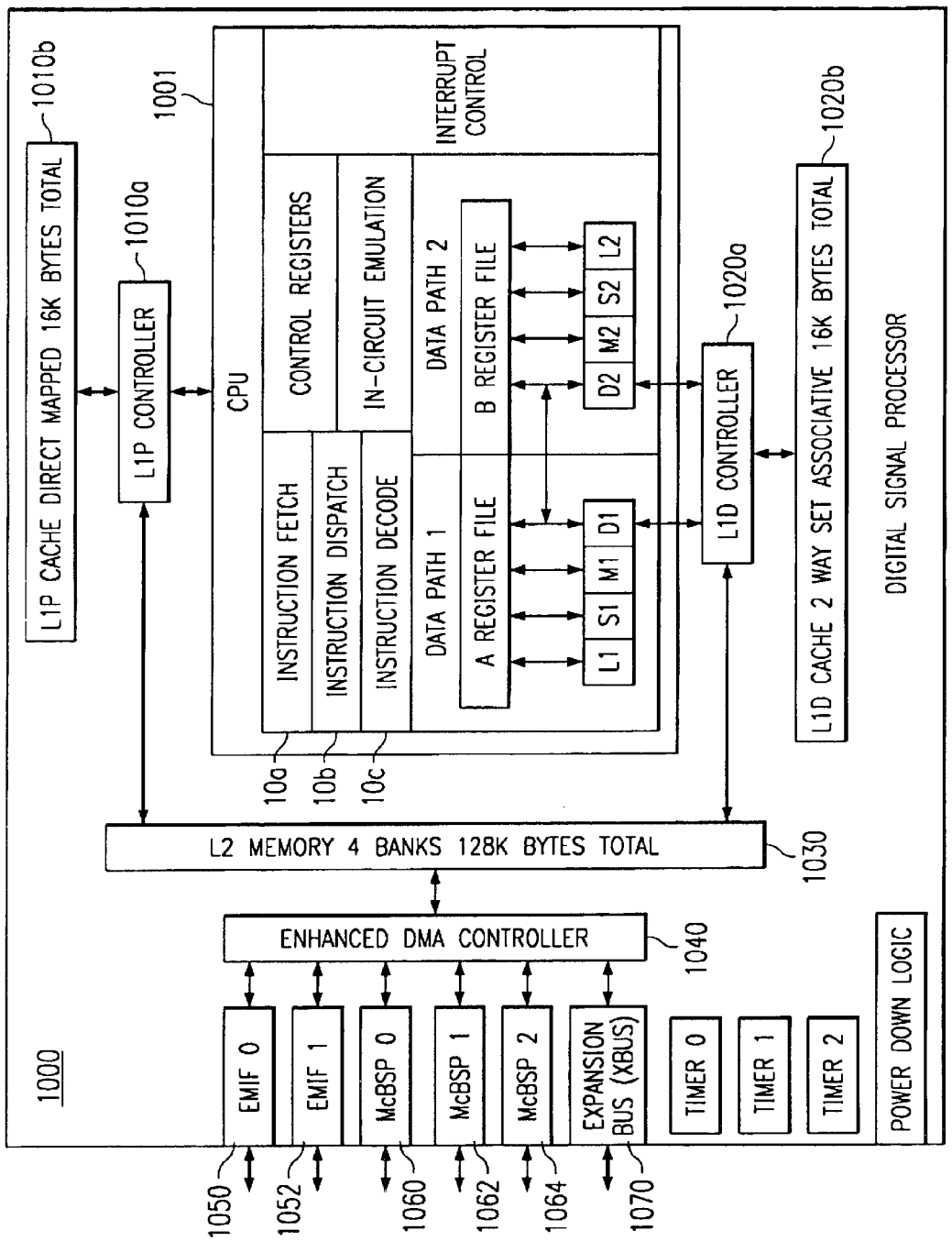
FIG. 10 is a block diagram of an alternative embodiment of the processor of FIG. 1.

FIG. 10 is a block diagram of an alternative embodiment of a digital system 1000 with processor core 1001 similar to processor core 10 of FIG. 1. A direct mapped program cache

1010b, having 16 kbytes capacity, is controlled by L1 Program (L1P) controller 1010a and connected thereby to the instruction fetch stage 10a. A 2-way set associative data cache 1020b, having a 16 Kbyte capacity, is controlled by L1 Data (L1D) controller 1020a and connected thereby to data units D1 and D2. An L2 memory/cache 1030 having four banks of memory, 128 Kbytes total, is connected to LIP 1010a and to L1D 1020a to provide storage for data and programs. External memory interface (EMIF) 1050 provides a 64 bit data path to external memory, not shown, which provides memory data to L2 memory 1030 via extended direct memory access (DMA) controller 1040.

EMIF 1052 provides a 16 bit interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DMA controller 1040. A detailed description of a McBSP is provided in U.S. Pat. No. 6,167,466 and is incorporated herein by reference.

The Very Long Instruction Word (VLIW) CPU of the present invention uses a 256-bit wide instruction to feed up to eight 32-bit instructions to the eight functional units during every clock cycle. The VLIW architecture features controls by which all eight units do not have to be supplied with instructions if they are not ready to execute. The first bit of every 32-bit instruction determines if the next instruction belongs to the same execute packet as previous instruction, or whether it should be executed in the following clock as a part of the next execute packet. While fetch packets are always 256-bit wide, execute packets can vary in size as shown with reference to FIGS. 3B–3D. Variable length execute packets are a key memory saving feature distinguishing CPU 1001 from other VLIW architectures.

Advantageously, instruction fetch stage 10a and dispatch stage 10b are constructed according to FIG. 9 such that an execution packet can span two fetch packets. Advantageously, NOP instructions are not needed to maintain execution packet alignment in processor 1001. Advantageously, CPU 1001 can execute an ADDKPC instruction as described above, such that a parameter specified by the ADDKPC instruction is combined with a value provided by the program counter of CPU 1001. As described above, the ADDKPC instruction can also specify a number of delay slots to be filled with virtual NOP instructions.

Other systems

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

Figure 11:
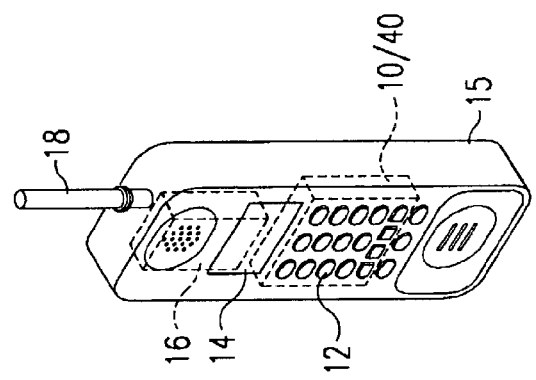
FIG. 11 is a wireless telephone that embodies the present invention.

FIG. 11 illustrates an exemplary implementation of an example of an integrated circuit that includes digital system 40 in a mobile telecommunications device 15, such as a wireless telephone with integrated keyboard 12 and display 14. As shown in FIG. 11 digital system 40 with processor (not shown) is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18.

Advantageously, by providing an ADDKPC instruction as described above, a return address can be computed with a single instruction and memory is not wasted with useless NOP instructions. Thus, a smaller memory can be included within the wireless telephone and fewer fetch cycles are required for execution of a given processing algorithm and power consumption is thereby reduced.

Fabrication

Fabrication of digital system 10 or digital system 1000 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Other embodiments and advantages

Thus, a microprocessor is provided with an ADDKPC instruction as described above, such that a parameter specified by the ADDKPC instruction is combined with a value provided by a program counter of microprocessor.

The ADDKPC instruction can also specify a number of delay slots to be filled with virtual NOP instructions such that memory is not wasted with useless NOP instructions.

Advantageously, an ADDKPC instruction can provide a relative address for use as a return address. A plurality of predicated ADDKPC instruction can provide a return address selected from a plurality of return address.

Advantageously, a compiler can reorder code with an ADDKPC instruction to absorb useless NOP instructions.

Advantageously, in some system a smaller memory may result from elimination of NOP instructions.

Advantageously, fewer fetch cycles are required for execution of a given processing algorithm since useless NOP instructions are not fetched.

Advantageously, an ADDKPC instruction may be used wherever a program counter relative address is needed, such as for passing parameters, for example.

In another embodiment, fetch packets may be longer or shorter than the present embodiments. Four example, a fetch packet may be four instruction words. Likewise, instruction words may be other sizes than 32-bits.

In another embodiment, there may be more or fewer execution units than eight. Likewise, the number of execution units may differ from the size of the fetch packet. For example, a processor may have an eight word fetch packet and have ten execution units, for example. In such an embodiment, an execution packet may exceed the length of a fetch packet and may therefore span more than two fetch packets.

In another embodiment, an ADDKPC instruction may be executable by more than one functional unit. Several ADDKPC instructions may then be executed in parallel.

In another embodiment, the PCE1 circuit provides an address that points to the first fetch packet if an execution packet spans fetch packets, regardless of which fetch packet actually contains the ADDKPC instruction.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital processing system comprising a microprocessor, wherein the microprocessor is operable to perform a method for calling a subroutine, the method comprising the steps of:
    branching to the subroutine by executing a first instruction to provide an address of the subroutine, said first instruction containing a plurality of delay slots; and
    calculating a complete turn address by executing a second instruction that is next to the first instruction to determine the return address, wherein no instructions separate the first and second instructions, said second instruction specifying a number of no-operation (NOP) instructions to execute in the plurality of delay slots.

2. The digital processing system of claim 1, wherein the step of calculating a complete return address comprises the step of adding a relative displacement value provided by the second instruction to program address value associated with the second instruction.

3. The digital processing system of claim 2, wherein the step of calculating a complete return address further comprises the step of storing the return address in a general purse register of the microprocessor.

4. The digital processing system of claim 1, wherein the second instruction is executed during a delay slot associated with the first instruction.

5. The digital processing system of claim 1, wherein the second instruction is finished executing before the first instruction is finished executing.

6. The digital processing system of claim 1, wherein during the step of calculating a complete return address, a plurality of second instructions are conditionally executed in response to a predicate value such that the return address is responsive to the predicate value.

7. The digital processing system of claim 1, wherein during the step of calculating a complete return address the return address is remotely associated with the second instruction.

8. The digital processing system of claim 1, further comprising the step of filling the plurality of delay slots associated with the first instruction in an instruction execution pipeline of the microprocessor by executing the number of NOP instructions specified by the second instruction.

9. A digital processing system comprising a microprocessor, wherein the microprocessor is operable to perform a method for forming a relative return address, the method comprising the steps of:
    fetching a sequence of instructions in response to address locations provided by a program counter; and
    executing a first instruction immediately after executing a branch-to-subroutine instruction in the sequence of instructions by using a first address value provided by the program counter as a source operand, said branch-to-subroutine instruction containing a plurality of delay slots, wherein said first instruction forms the relative return address, said relative return address associated with the branch-to-subroutine instruction, wherein said first instruction specifies a number of virtual no-operation (NOP) instructions to execute in the plurality of delay slots.

10. The digital system of claim 9, wherein the step of executing a first instruction comprises the step of combining a displacement value provided by the first instruction with the first address value provided by the program counter to calculate the relative return address.

11. The digital system of claim 10, wherein the step of executing the first instruction further comprises the step of providing the number of virtual instructions for execution after the step of executing the first instruction.

12. The digital system of claim 10, wherein the microprocessor comprises:
    an instruction execution pipeline having a plurality of stages;
    the program counter being associated with a fetch stage of the instruction execution pipeline;
    FIFO circuitry connected to receive address values from the program counter, the FIFO circuitry operable to delay each address value received from the program counter; and
    a first functional circuit associated with an execution phase of the instruction execution pipeline connected to receive a delayed address value from the FIFO circuitry, wherein the first functional circuit is operable to add the displacement value provided by the first instruction to a first delayed address value provided by the program counter.

13. The digital system of claim 12, further comprising:
    a plurality of functional units associated with the execution phase of the instruction execution pipeline;
    wherein the instruction execution pipeline receives a fetch packet containing a plurality of instructions associated with each address value provided by the program counter;
    wherein a dispatch stage of the pipeline is operable to provide an execution packet that spans two or more fetch packets; and
    wherein the FIFO circuitry is operable to provide the first delayed address value such that the first delayed address value is associated with one of the two or more fetch packets in which an instruction executed by the first functional unit is located.

14. The digital system according to claim 9 being a cellular telephone, further comprising:
    an integrated keyboard connected to the microprocessor via a keyboard adapter;
    a display, connected to the microprocessor via a display adapter;
    radio frequency (RF) circuitry connected to the microprocessor; and
    an aerial connected to the RF circuitry.

15. A method for calling a subroutine in a digital processing system comprising a microprocessor, the method comprising the steps of:

branching to the subroutine by executing a first instruction to provide an address of the subroutine, said fist instruction containing a plurality of delay slots; and calculating a complete return address by executing a second instruction that is next to the first instruction to determine the return address, wherein no instructions separate the first and second instructions, said second instruction specifying a number of no-operation (NOP) instructions to execute in the plurality of delay slots.

16. The method of claim 15, wherein the step of calculating a return address comprises the step of adding a relative displacement value provided by the second instruction to a program address value associated with the second instruction.

17. The method of claim 15, wherein the step of calculating a return address further comprises the step of storing the return address in a general purpose register of the microprocessor.

18. A method for forming a relative return address in a digital processing system comprising a microprocessor, the method comprising the steps of:

fetching a sequence of instructions in response to address locations provided by a program counter; and executing a first instruction immediately after executing a branch-to-subroutine instruction in the sequence of instructions by using a first address value provided by the program counter as a source operand, said branch-to-subroutine instruction containing a plurality of delay slots, wherein said first instruction forms the relative return address, said relative return address associated with the branch-to-subroutine instruction, wherein said first instruction specifies a number of virtual no-operation (NOP) instructions to execute in the plurality of delay slots.

19. The method of claim 18, wherein the step of executing a first instruction comprises the step of adding a displacement value provided by the first instruction to the first address value provided by the program counter.

20. The method of claim 19, wherein in the step of executing the first instruction further comprises the step of providing the number of virtual NOP instructions for execution after the step of executing the first instruction.

21. A method for operating a compiler for a microprocessor, wherein the microprocessor is operable to execute a first type of instruction that performs a specified operation and also directs that a selectable number of virtual no-operation (NOP) instructions be executed after executing the first type of instruction, the method comprising the steps of:

determining that a first instruction of the first type of instruction containing a predicate having two states is to be executed in a delay slot of a first branch type instruction if the predicate is in a first state, wherein said first instruction calculates a first return address;

determining that a second instruction of the first type of instruction containing the predicate having two states is to be executed in a delay slot of the first branch type instruction if the predicate is in a second state, wherein said second instruction calculates a second return address;

arranging an instruction sequence such that the first instruction is executed after the second instruction;

determining a remaining number of unused delay slots of the first branch type instruction; and inserting a value in the first instruction to direct that a selectable number of virtual NOP instructions be executed after executing the first type of instruction, wherein the selectable number of NOPs is the remaining number of unused delay slots of the first branch instruction.

* * * * *